Jan. 29, 1957 C. O. SOHLBERG 2,779,444
SPEED GOVERNOR, PARTICULARLY FOR DIALS
Filed Dec. 28, 1954 2 Sheets-Sheet 1
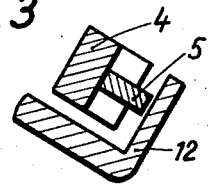
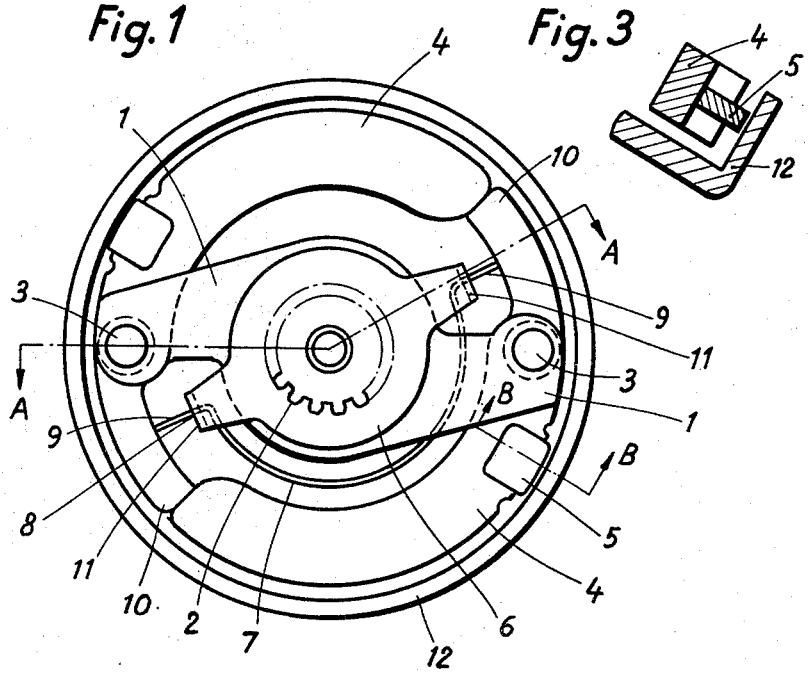
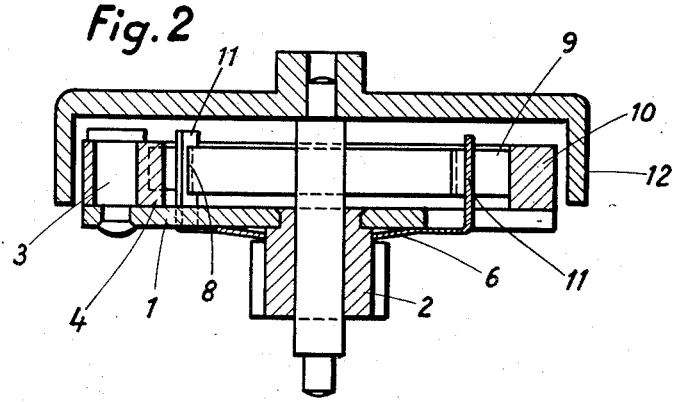
INVENTOR
CARL OSCAR SOHLBERG
By Fredrick E. Hane
ATTORNEY Jan. 29, 1957     C. O. SOHLBERG     2,779,444
SPEED GOVERNOR, PARTICULARLY FOR DIALS
Filed Dec. 28, 1954     2 Sheets-Sheet 2

INVENTOR
CARL OSCAR SOHLBERG
By
ATTORNEY

United States Patent Office

2,779,444
Patented Jan. 29, 1957

2,779,444
SPEED GOVERNOR, PARTICULARLY FOR DIALS

Carl Oscar Sohlberg, Stockholm, Sweden, assignor to Telefonaktiebolaget L M Ericsson, Stockholm, Sweden, a corporation of Sweden Application December 28, 1954, Serial No. 478,104

Claims priority, application Sweden September 27, 1954

3 Claims. (Cl. 188—184)

This invention relates to a speed governor, particularly for dials used within automatic telephone districts. In such governors the brake weight of the governor is at its one end usually supported on a pin so that, upon rotation of the governor, the brake weight tends to swing out towards a brake sleeve. In such a case there are generally used tension springs to produce a force on the brake weight that counteracts the centrifugal force. Accordingly it is only at a certain speed that the brake weight begins to function. It is however rather troublesome to apply these springs. It is an object of the present invention to produce—in a more simple way than in earlier constructions—the power that counteracts the centrifugal force. According to the invention this is achieved by the brake weight being shaped as a lever with a prolongation on the other side of the supporting pin and by a pressure spring being arranged to rest against said prolongation with a force that counteracts the centrifugal force.

Figure 4:
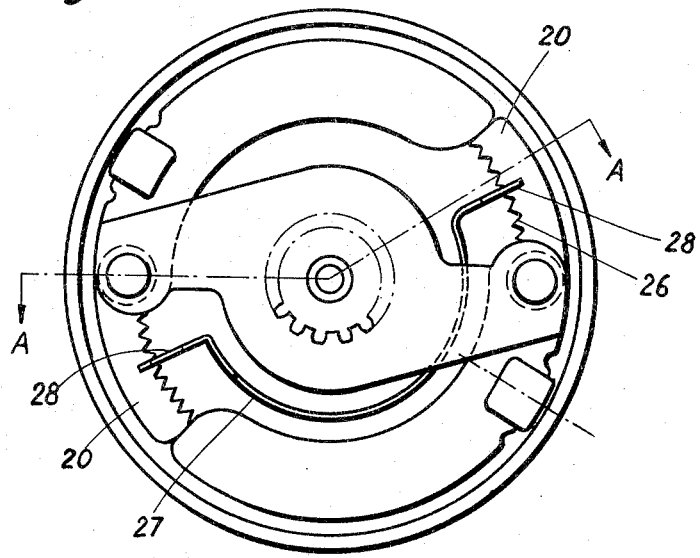
Figure 5:
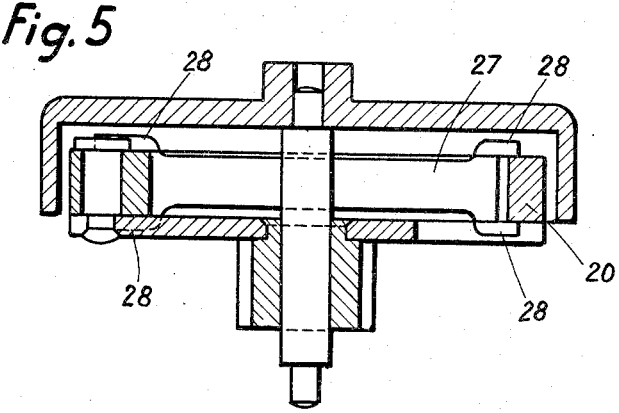

The invention will be described more in detail with reference to the attached drawings, which show two embodiments of the invention. Fig. 1 shows an enlarged top plan view of a governor and Fig. 2 is a transverse section of this governor along the cut A—A in Fig. 1. Fig. 3 is a transverse section of a detail along the cut B—B in Fig. 1. Figs. 4 and 5 show in the same way as Figs. 1 and 2 another embodiment of a governor.

On the body 1 of the governor, Figs. 1 and 2, are riveted two shafts 3 located diametrically and a central gear wheel 2. On each of these shafts there is a brake weight 4 supported turnably at its one end. Each brake weight is shaped as a lever with a prolongation 10 on the other side of the supporting pin 3. The transverse section of these prolongations is smaller than that of the brake weights. When the gear wheel 2 is caused to rotate and thus also the body 1 with the shafts 3, the brake weights 4 tend to swing outwards towards a cylindrical brake drum 12 under centrifugal action. For the purpose of limiting this pendulus motion to a certain speed for the gear a pressure spring 7 is, according to the invention, arranged to rest with its ends 9 against the prolongations 10 of the brake weights, said prolongations tending to swing inwards when the brake weights tend to swing outwards. This pressure spring consists of a semicircular plate spring 7, the two ends 9 of which are bent out radially. To make the plate spring remain stretched between the prolongations 10 in the position in which it has been placed, it will be steered in slots or apertures 8. These suitably consist of rectangular holes 8 located in two laps 11, on an adjustment washer 6 which is centrally arranged and turnable. Said holes 8, which enclose the radial portions 9 of the plate spring, are so large that the plate spring can move freely in them when pressed together upon movement of the prolongations. If the adjustment washer is turned the ends 9 of the plate spring will slide along the prolongations 10, whereby the ends are moved to a larger or smaller distance from the centres of motion of the brake weights, the shafts 3. The counteracting torsional moment on the brake weights caused by the plate spring may thus be varied to the desired magnitude. The adjustment washer 6 is suitably a little resilient and is placed with its central, inner edge between a protruding portion of the gear wheel 2 and the body 1. In this way it will be easy to reach the washer and turn it to the desired position. The brake weights 4 are provided with slots, in which brake studs 5, Figs. 1 and 2, are riveted. Upon rotation of the regulator these will slide against the inner wall of the brake sleeve 12.

The embodiment shown in Figs. 4 and 5 differs from the one now described in the following respects. The pressure spring 27 is not steered in holes on an adjustment washer but lies directly stretched between the prolongations 20 of the brake weights. The portion 20 of the prolongations extending inwardly is toothed or provided with slots so as to enable the pressure spring to remain in the position in which it has been placed and be moved between different positions along the prolongations 20. The pressure spring is suitably in both ends shaped as a fork 28, Fig. 5, which clutches the sides of the prolongations so as to prevent it from being moved sideways.

I claim:

1. A speed governor comprising, in combination, a substantially circular brake sleeve, a body portion rotatably supported within said sleeve, a pair of brake weights each comprising a lever having a brake sleeve engaging portion and an extension, pivot means disposed between said sleeve engaging portion and said extension pivotally supporting said lever on said body portion, a spring support plate rotatably supported within said sleeve, spring means slidably received within said support plate and disposed in adjustable engagement between each extension of each said levers, said support plate being adapted to be rotated to effect simultaneous adjustment of the engagement of said spring means with each said extension relative to the respective pivot means.

2. A speed governor as set forth in claim 1, wherein said spring support plate is supported for rotation about the axis of rotation of said body portion.

3. A speed governor comprising, in combination, a substantially circular brake sleeve, a body portion rotatably supported within said sleeve, at least one brake weight comprising a lever having a brake sleeve engaging portion and an extension and having pivot means disposed therebetween, each said brake weight being supported through said pivot means on said body portion adjacent to said brake sleeve, a spring support plate supported within said sleeve for rotation with said body portion, spring means slidably supported by said support plate and adjustably disposed relative to said pivot means in operative engagement with each said extension to maintain a predetermined pressure in one direction yieldingly restraining movement of said brake weight into engagement with said brake sleeve in said one direction, said spring support plate being selectively rotatable relative to said body portion to adjust the position of engagement of said spring means with said extension relative to said pivot means to adjust said predetermined pressure, whereby said brake sleeve engaging portion is adapted to be urged into engagement with said brake sleeve against the action of said spring by centrifugal force upon rotation of said body portion, the magnitude of force required to cause said engagement being dependent upon the adjustment of said spring means relative to said extension.

References Cited in the file of this patent

UNITED STATES PATENTS

| | | |
|---|---|---|
| 787,284 | Erben | Apr. 11, 1905 |
| 1,958,884 | Bonanno | May 15, 1934 |

FOREIGN PATENTS

| | | |
|---|---|---|
| 838,771 | Germany | May 12, 1952 |